United States Patent
Gillette

[11] 3,900,398
[45] Aug. 19, 1975

[54] SYSTEM FOR EXCHANGING BLOOD ULTRAFILTRATE

[75] Inventor: Deighton D. Gillette, Ames, Iowa

[73] Assignee: Iowa State University Research Foundation, Inc., Ames, Iowa

[22] Filed: Sept. 24, 1973

[21] Appl. No.: 400,388

Related U.S. Application Data

[62] Division of Ser. No. 167,571, July 30, 1971, Pat. No. 3,788,319.

[52] U.S. Cl. ............... 210/196; 210/433; 210/456
[51] Int. Cl.² ....................................... B01D 31/00
[58] Field of Search ....... 210/22, 23, 321, 433, 456, 210/196

[56] References Cited
UNITED STATES PATENTS

| | | | |
|---|---|---|---|
| 3,352,422 | 11/1967 | Heden | 210/321 |
| 3,585,131 | 6/1971 | Esmond | 210/493 X |
| 3,669,879 | 6/1972 | Berriman | 210/321 X |
| 3,674,440 | 7/1972 | Kitrilakis | 210/321 X |
| 3,705,100 | 12/1972 | Blatt et al. | 210/321 X |

Primary Examiner—Frank A. Spear, Jr.
Attorney, Agent, or Firm—Dawson, Tilton, Fallon & Lungmus

[57] ABSTRACT

An ultrafiltrate prepared from the blood of a host is put into the venous bloodstream of a recipient while simultaneously withdrawing an ultrafiltrate from the arterial bloodstream of the recipient at approximately the same rate. The ultrafiltrate intended for the recipient is prepared by withdrawing it from the arterial system of the host while simultaneously introducing the recipient's ultrafiltrate into the host's venous system for processing. The parabiotic exchanges for both host and recipient may be done simultaneously; but if they are not, it is preferred to collect the ultrafiltrate of each in a plurality of quantities. In the latter case, the exchange is effected by introducing the ultrafiltrate in inverse order of purity in the case of the recipient and by introducing the ultrafiltrate into the host in order of purity of the quantities to promote more efficient processing by the host. Preferred apparatus for a plasma extractor and continuous ultrafilter are also disclosed.

5 Claims, 8 Drawing Figures

SYSTEM FOR EXCHANGING BLOOD ULTRAFILTRATE

This is a Divisional Application of copending application Ser. No. 167,571, filed July 30, 1971 now U.S. Pat. No. 3788319.

FIELD OF THE INVENTION

The present invention relates to a system for the treatment of blood; and although it could be used as a substitute for prevailing techniques of renal hemodialysis, it may also be used in the treatment of many other degenerative types of disease in which certain normal body functions are lacking or have deteriorated.

SUMMARY

Blood is extracted from a first animal (called the "host") whose biochemical functions are performing in a normal or healthy manner. An ultrafiltrate is prepared from this blood containing only water and molecules of small molecular weights and excluding the blood cells, proteins and molecules of larger molecular weights. The ultrafiltrate is introduced into the venous blood stream of a second animal (called the "recipient") whose biochemical functions are not performing normally. At the same time the "pure" ultrafiltrate is introduced into the recipient's venous system, ultrafiltrate is being prepared from its arterial blood at about the same rate the pure ultrafiltrate is added to his system. The ultrafiltrate removed from the recipient is "impure" in the sense that it contains waste and substances or other components not removed from the recipient's blood or processed by his body due to malfunction in the recipient's system.

The impure ultrafiltrate prepared from the recipient is introduced into the venous blood stream of the host while, at the same time, the pure ultrafiltrate intended for the recipient is prepared from the host's arterial blood stream. Again, the rate at which the ultrafiltrate is prepared from the host's blood is approximately equal to the rate at which the recipient's ultrafiltrate is added to the host's system. Thus, the ultrafiltrate of the host animal's blood from which waste and toxic substances have been removed by normal physiological processes is used to reconstitute the sick animal's blood while the ultrafiltrate of the recipient's blood is simultaneously prepared for processing by the host.

In preparing the ultrafiltrates, plasma is first separated from the cells, and the separated plasma is fed through a high pressure ultrafiltration system in which there is prepared an ultrafiltrate including water, soluble salts and other components of small molecular weight. The blood components, except for the ultrafiltrate of the one animal (including cells, proteins and components of large molecular weight) is mixed with the ultrafiltrate of its counterpart (impure ultrafiltrate in the case of the host's reception and pure ultrafiltrate in the case of the recipient) and returned directly to the animal from which it came.

The introduction of ultrafiltrate into the system of one animal is concurrent with the preparation of ultrafiltrate from that animal's blood; however, the introduction (and concurrent preparation) of ultrafiltrate for one animal need not be concurrent with the same process for the other animal. Thus, processing the blood of the host could take place in a different time and place than the processing of the recipient's blood if it were more convenient.

In this case, it is preferred that the ultrafiltrate of each animal (which is meant to include humans) be collected in separated quantities. The ultrafiltrate of the recipient will decrease in concentration of impurities from the first to the last quantity because pure ultrafiltrate is being added to its system, while the ultrafiltrate of the host will evidence a corresponding increase in impurity concentration as it is removed. Then, during the parabiotic exchange of ultrafiltrate, the ultrafiltrate is preferably added to the host's system in reverse order from which it was taken from the recipient (i.e., the lowest concentration of impurities is added first). Similarly, the individual quantities of ultrafiltrate prepared from the host's blood is added to the recipient's system in reverse order from that in which it was removed from the host (i.e., that with the higher concentration of impurities is added first).

This process is referred to as incremental counter current exchange, and it has the beneficial result that by adding the most pure ultrafiltrate first to the host, more efficient cleansing or processing of the malfunctioning animal's blood is promoted because the build up of concentration of impurities is incrementally increased. By adding the ultrafiltrate having the highest concentration of impurities first to the recipient, one is able to obtain the gradation of impurity concentration desired to obtain this result.

Thus, it is preferred that blood is removed from each animal and ultrafiltrate is introduced into the system of that animal on a continual, though not necessary continuous, basis. That is, "continual" herein contemplates that quantities of blood may be taken from each animal in increments for processing. Further, although for each animal the introduction of ultrafiltrate and removal of ultrafiltrate is concurrent and continual, the processing of the two animals may be at different times. It is further contemplated that the processing could be extended over a period of time to alleviate toxic effects on the host or to be more compatible with the habits and working hours of the people involved. Conversely, the processing time could be reduced to reduce the toxicity level in the recipient's blood quicker, or the processing of either animal could be interrupted for extended periods of time and even occur in different places, depending upon the circumstances.

The apparatus used for the practice of the invention may include a continuous flow high-pressure ultrafilter with a plurality of mixing chambers having circular crosssections. Each chamber is provided with a rotor having a plurality of channels extending outwardly from the center of the rotor in the general form of a spiral. Further, each channel along its spiral path is routed alternately above and below the rotor in an undulating manner. This forces plasma introduced at the center of the rotor alternately against upper and lower filtration members as the material being processed flows outwardly (because of the centrifugal force established by the rotating rotor) and down a pressure gradient (established by a pump).

The protein-free ultrafiltrate which passes through these filters is then collected from each chamber and constitutes the ultrafiltrate adapted to be mixed with the blood of the counterpart animal (which has been processed to reduce its ultrafiltrate), and this reconstituted plasma is then mixed with the cellular fraction removed from the first animal's blood, and finally returned to the first animal—from which it came.

A motor is used to rotate a special canister or rotor about the exterior of a separating chamber. This canister has a layer of small permanent magnets embedded in it and registering with corresponding impellers in the separating chamber. When driven by means of a motor, the canister turns and drives the impellers in the separating chambers by magnetic interaction.

With the present system, any small molecules in the ultrafiltrate, such as glutethimide, kanamycin, guanidino succininic acid and the more normal creatinine and uric acid which may contribute to uremic systems are removed much faster than in conventional renal dialysis. Moreover, the beneficial components of the ultrafiltrate such as amino acids, glucose and vitamins may be increased by exchange with a normal host. That is, much of the biochemical and physiological blood processing systems of the host are used on the ultrafiltrate of the recipient, not only to purify and filter it, but also, as the situation may demand, to supplement it and overcome deficiencies caused by malfunctions in the recipient's system.

Thus, the parabiotic exchange of blood ultrafiltrate according to the present invention might be used to alleviate debilitating conditions other than kidney malfunction, such as cancer, hepatitis, edema, coma, poisoning, recovery from surgery or anesthesia, or excessive chemotherapeutics.

In a preferred embodiment the plasma extractor is firmly attached to each animal involved to decrease the risk of hemmorrhage and to simplify operational procedures, thus rendering the whole process more compatible with normal living. The small extravascular volume (of the order of 10 milliliters) and large flow rate, (up to 1/5 cardiac output) through the plasma extractor would reduce clotting as well as the need for heparin and the residual losses of blood. Further, the return of all proteins and exchange of small molecular metabolites such as amino acids, fatty acids and glucose would conserve body supplies. Further, it will be observed that there is no need for a dialysis fluid, thus raising the possibility of reduced heparinization because of the reduced extravascular blood surface per unit flow of blood, and the filters and tubes are re-usable. Blood transfusions, as are frequently required in current hemodialysis, are eliminated.

Other features and advantages of the present system will be apparent to persons skilled in the art from the following detailed description of preferred embodiments accompanied by the attached drawing wherein identical reference numerals will refer to like elements in the various views.

DETAILED DESCRIPTION

Figure 1:
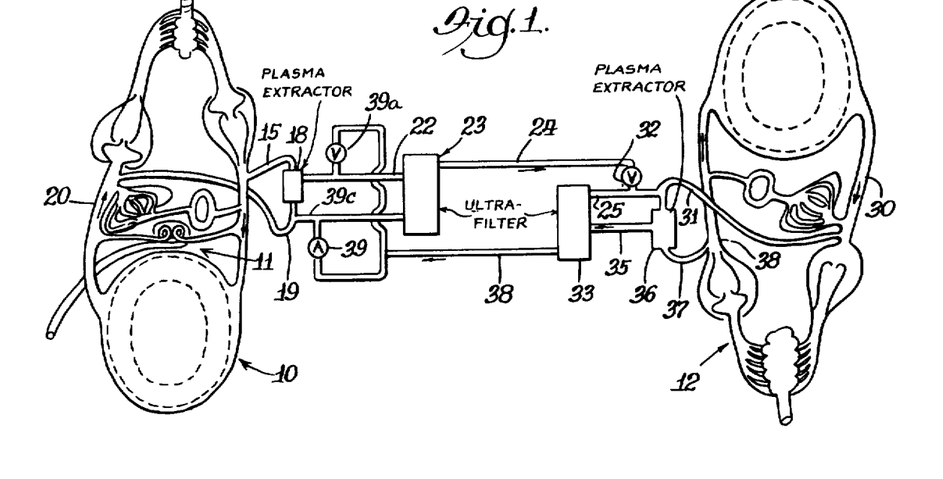
FIG. 1 is a schematic illustration of a system incorporating the present invention.

Turning first to FIG. 1, there are shown in diagrammatic form certain of the vital organs of two animals. The first animal, generally designated by reference numeral 10, is shown on the left of FIG. 1; and this animal is the healthy or "host" animal, having normally functioning kidney schematically illustrated at 11. The other biochemical and physiological systems of the animal 10 are also normally functioning, but most attention will be directed to the kidney since an understanding of this aspect will lead to a complete understanding of the invention. For example, the invention may be used to assist persons with malfunctioning livers, adrenals or gastro-intestinal tracts. The animal to the right is generally designated by reference numeral 12, and it is shown as without a kidney, although in certain cases the invention may be used with a sick animal or patient wherein the kidney is diseased or temporarily malfunctioning, as with poisoning.

A first conduit 15 is connected from an artery 16 of the host 10 to an input port of a plasma extractor 18, described in greater detail within. The output of the plasma extractor 18 is connected by means of a conduit 19 to a vein 20 of the host 10.

As is well known, blood is a tissue having a number of different types of cells suspensed in plasma. Blood consists of about 45 percent by volume, of these cells, and 55 percent is plasma. Plasma consists essentially of the fluid part of the blood which suspends the cells; and it is formed as a solution of approximately 92 percent water, 7 percent proteins and the remaining 1 percent of various molecules, mostly salts. The blood cells which are suspended in the plasma include red blood cells (also referred to as erythocytes), white blood cells (also known as leukocytes) and platelets.

With this in mind, the principal function of the plasma extractor 18 is to continually receive whole blood from the host 10 under arterial pressure and separate plasma from the cells while returning the cells directly back to the animal 10 immediately after separation. As a practical matter, some plasma will also be returned because of the difficulty in obtaining a complete separation. The returned fractions of the Host's blood are reconstituted with ultrafiltrate from the recipient for processing in the host. The rate of return of the reconstituted blood is preferably as near as possible, equal to the rate of withdrawal from the host.

The plasma from the extractor 18 is fed via conduit 22 to a high pressure ultrafilter system generally designated by reference numeral 23. The principal function of the ultrafilter system 23 is to prepare an ultrafiltrate. This is accomplished by separating the plasma into two components:

1 a filtrand containing all components of the first filtrate which are not in solution in the water, but concentrated in protein as well as any of the other, larger molecules; and 2 a second filtrate composed of the water and smaller molecules, mostly in solution. The water and its other components of small molecular weights is sometimes herein referred to as the ultrafiltrate, and it is fed through the output of the ultrafilter system 23 via a conduit 24 to be mixed with the contents of a conduit 25 which ultimately connects with a vein 30 of the recipient 12 by means of a conduit 31. There is a conventional check valve 32 provided at the juncture between the conduits 24 and 25 so that the host's ultrafiltrate and the output of a second ultrafilter system 33 (this one associated with the recipient) flow only into the recipient's system, and there is no back flow. The ultrafilter system 33 is similar to the previously-mentioned ultrafilter system 23 in its structure, operation and result, except that, as mentioned, it processes the plasma of the recipient's blood.

Plasma is delivered to the ultrafilter system 33 by means of a conduit 35 which is connected to receive the output of a second plasma extractor generally designated by reference numeral 36 and similar to the previously-mentioned extractor 18. A conduit 37 couples an artery 38 of the recipient's system to the input of the plasma extractor 36. The ultrafiltrate from the system 33 is coupled by means of a conduit 38 to an arrangement of double check valves 39 and 39a which lead respectively to a conduit 39c and conduit 22 (i.e., the input and output of the ultrafilter 23). The reason for the double check valves is to permit a rinse and wash cycle for the ultrafilter 23, as will be described; and a similar double check valve system could be employed in connection with the ultrafilter 33, if desired.

The conduit 39c leads from the filtrand output of the ultrafilter 23 to the conduit 19 which also contains the cellular fraction of the host's blood. Normally, the valve 39 is open and the valve 39a is closed. Thus, the conduit 39c carries the filtrand from the first ultrafilter system 23 and mixes it with the ultrafiltrate prepared from recipient's blood. This combination is then mixed with the output of the plasma extractor 18 and fed to vein 20 of the host animal system by means of conduit 19. Check valves are also employed at the juncture of conduits 39c and 19 to insure that unidirectional flow is established from the plasma extractor 18, the ultrafilter system 23, and ultrafilter system 33 into the conduit 19. If desired, a pump could be interposed in the conduit coupling plasma to the ultrafilter for each animal depending upon the desired operating pressure for the ultrafilters.

Thus, the system illustrated in FIG. 1 provides for the parabiotic exchange of blood ultrafiltrate wherein the ultrafiltrate from the host is reconstituted with the cells, proteins and larger molecules of the recipient and fed directly into its system. Conversely, the ultrafiltrate from the recipient's system is reconstituted with the cells, proteins and larger molecules of the host's blood and then coupled directly to the host's system for cleansing or other processing in this normally-functioning animal.

In the case of each animal, the ultrafiltrate prepared from the blood of the other animal is preferably introduced at about the same rate that ultrafiltrate is being prepared from its blood so there is no net loss of fluid. The preparation of ultrafiltrate from each animal's blood takes place concurrently with the introduction of ultrafiltrate prepared from the other animal into the first animal's blood stream; however, as will be made clear below, it is considered an important feature of the invention that both animals need not be treated or processed simultaneously.

It will be apparent to persons skilled in the art that the roles of artery and vein for each animal could be reversed, but it is thought that by taking blood from the arterial system for processing, the higher pressure would facilitate the separation steps required. Another mode of operation will be described below wherein it is permitted to process the host and recipient separately by collecting the ultrafiltrate of each in a number of separate quantities.

The processing of the blood of the host animal may take place in a different time and place than the processing of the blood of the recipient. This would permit perhaps a more convenient schedule for processing for each. In this situation, the ultrafiltrate would first be prepared from the host animal, replacing the lost fluid with an electrolyte solution. Further, the ultrafiltrate is collected in separate quantities or individual vials. For the first preparation of the host, the purity of the ultrafiltrate will be substantially constant so that the order of introduction into the recipient at a later time does not matter. However, when the ultrafiltrate is prepared from the recipient's blood, each separate quantity will have a decreasing amount of impurities because the pure ultrafiltrate is being concurrently introduced into the bloodstream of the recipient. When the recipient's ultrafiltrate is then introduced into the host's system, there is a countercurrent exchange — that is, the last quantity prepared (being the most pure) is introduced into the host's bloodstream first.

For the ultrafiltrate that is being concurrently prepared from the host's blood for the second and subsequent times, then, there will be an order of increasing impurity. This order is reversed when the individual quantities of ultrafiltrate are introduced into the recipient's system for the second time so that the quantity with the greatest amount of impurities is introduced first.

By adding the most pure ultrafiltrate to the host's bloodstream first, a more efficient cleansing or processing of the recipient's blood is promoted because the buildup of concentration of impurities in the host's blood is incrementally increased. The reason for adding the ultrafiltrate having the highest concentration of impurities to the recipient first is that it enables one to obtain the gradation of impurity concentration desired to be introduced into the host.

Systems are known for performing the function of the plasma extractors 18 and 36. One such system which is capable of extracting plasma from whole blood is described in U.S. Pat. No. 3,489,145 of Judson, et al. In the system described in that patent, however, discrete quantities of whole blood are taken intermittently from a donor's circulatory system, but the separation of the blood into its components is on a contiguous, non-interrupted basis. This type of continually operating system is satisfactory, although it is preferred to continuously withdraw blood from each animal. In this context, the word "continual" is intended to mean the withdrawing and processing of quantities of blood over an extended period of time, although the withdrawing may be in predetermined incremental quantities.

Figure 2:
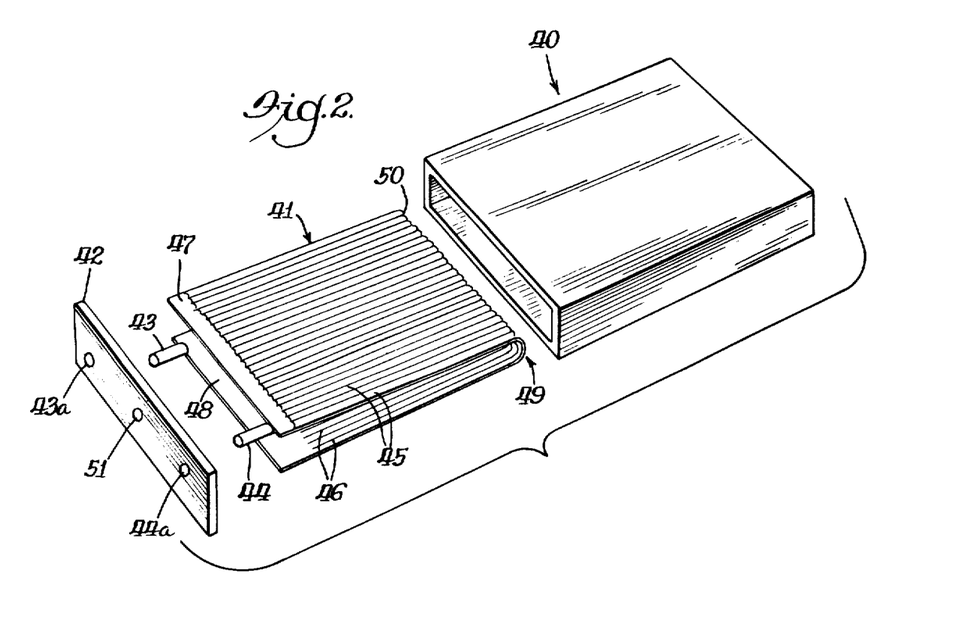
FIG. 2 is a perspective view, with parts in exploded relation, of a plasma extractor which may be used in the system of FIG. 1.

A proposed extractor for operation on a continuous basis is illustrated in FIG. 2, and it includes three principal elements: a casing 40, a filtering element 41 and a cover 42 which is adapted to seal the filtering element 41 within the casing 40. The filtering element 41 includes a double-layer of a porous polyvinyl membrane formed into a closed pouch. The membrane has pores of two microns in diameter, of the type which is manufactured by The Millipore Corp. of Bedford, Massachusetts. Preferably, the membrane is pre-soaked and treated with G-gel, a material described by Professor Merrill of Massachusetts Institute of Technology, which acts both to reduce the pore size of the membrane and to prevent coagulation of the blood. An input port 43 and an output port 44 are sealed into opposite diagonal ends of the filter pouch. A number of upper parallel tubes or conduit 45 are formed by longitudinal seals between the upper and lower layers, and a similar series of lower conduits 46 are similarly formed. These longitudinal seals terminate short of the edges of the filtering element to which the ports 43, 44 are connected to thereby form an inlet manifold 47 and an outlet or exhaust manifold 48. The longitudinal seals similarly terminate short of the transverse fold of the entire membrane indicated by reference numeral 49 to thereby form an exchange manifold 50 between the upper conduits 45 and the lower conduits 46. The exchange manifold 50 reduces stoppage at the fold which would otherwise constrict the longitudinal conduits 45 and 46. A plastic mesh (not shown) may be inserted between each folded layer of the pouch (if more than one fold is used) and on top and bottom of the folded filter element to insure that the filter element is evenly distributed without restriction when placed in the container 40. When assembled, the tubes 43 and 44 protrude through suitable openings designated 43a and 44a respectively in the cover 42, and a third opening 51 is provided through the cover 42 for recovering plasma.

In operation, arterial blood is fed from the conduit 15 of FIG. 1 into the port 43 where it travels through the longitudinal conduits of the filtering element 41. The filtrand, enriched in cells, is recovered from the port 44 and fed to the conduit 19 where the host's blood is reconstituted to include the recipient's ultrafiltrate. The reconstituted blood is then fed into a main vein of the host. The plasma extractor 36, it will be realized, will be structured and operate in a similar manner for the recipient 12.

The blood may be run through the channeled filter element 41 at arterial pressure. Some plasma seeps through the membrane into the spaces formed in the plastic mesh and is sucked out (by means of a pump not shown) through the port 51. The use of the diagonally-placed ports 43 and 44 assures equal distance and therefore flow resistance, of all blood channels, port-to-port. The folding of the membrane permits stacking of the membrane into a smaller container while the open exchange manifold at the fold prevents constriction, as mentioned.

Referring now to FIGS. 3–8, the structure of the ultrafilter systems 23 and 33 will be described in greater detail. The mechanism is housed in a steel cylindrical casing 55 provided with an outwardly formed supporting flange 56. A rotor includes a canister 57 which is mounted within the casing 55 by means of upper and lower ball bearings designated respectively 58 and 59. The canister 57 is cup-shaped having a cylindrical side wall 60 and a base 61 to which a shaft 62 is attached. The cylindrical side wall 60 is mounted coaxially with the cylindrical casing 55 of the system and the shaft 62 is driven by a motor to rotate the rotor.

Figure 3:
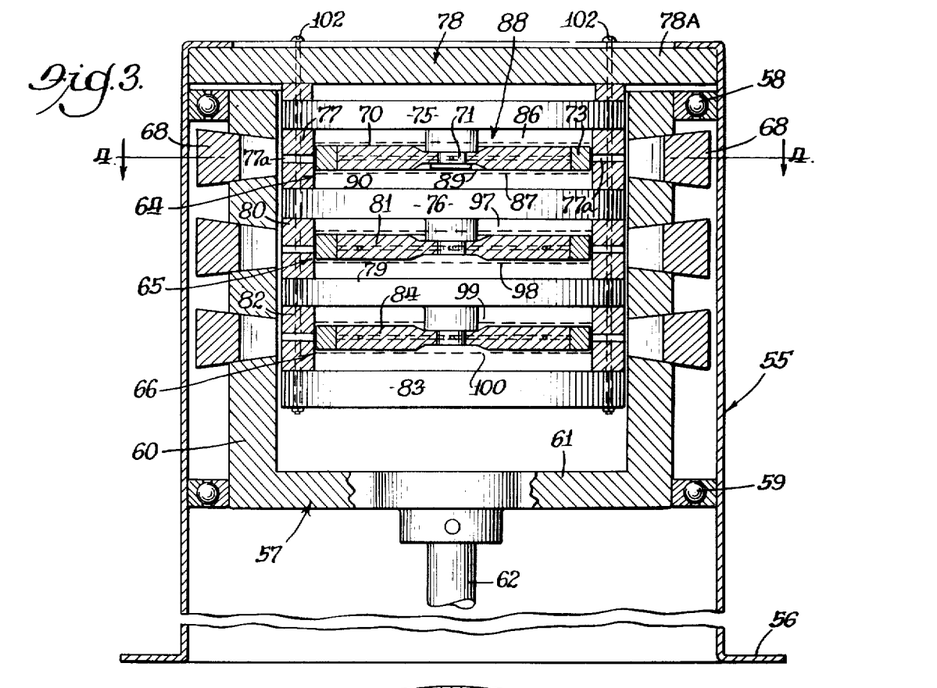
FIG. 3 is a side sectional view of an ultrafilter which may be used in the system of FIG. 1.

In the illustrated embodiment there are three separate sections for processing the plasma, and in FIG. 3, these are generally designated respectively by reference numerals 64, 65, and 66. However, in the illustrated embodiment, there are two separate stages of filtering. That is, the plasma is fed into the first filtering section 64 wherein a rather coarse membrane may be used to separate only the very large molecules, for example, the albumins and most of the globulins. The second and third sections 65 and 66 would then have a finer membrane, passing only molecules having a molecular weight less than around 10,000. Thus, all of the globulins, myoglobin and hemoglobin are removed, leaving only the smaller molecules including amino acids, glucose, urea and creatine, as well as ions such as phosphate, sulphate, chloride, sodium, potassium and calcium.

A very important aspect of the present invention is that the processing of the ultrafiltrate from the recipient is not limited to the kidneys of the host. Since the ultrafiltrate mixes with the blood of the host, it is distributed throughout the entire system of the host for complete treatment by the normal system of the host. For example, it has been found that guanidino succinic acid in blood may be a toxic factor in uremia and that the carotenoids (smaller than 10,000 molecular weight) are not properly excreted and contribute to ill health. With the present invention, both substances would be treated in the host's system.

Returning now to FIG. 3, each of the sections 64–66 is similar, and only one of them need be described in further detail for a complete understanding of the invention, it being understood that the number of such units depends upon the application, and that the illustrated embodiment is advantageously adaptable to incorporation of any number of such units. The layout of fluid communication channels will then be explained in connection with FIG. 8.

Figure 4:
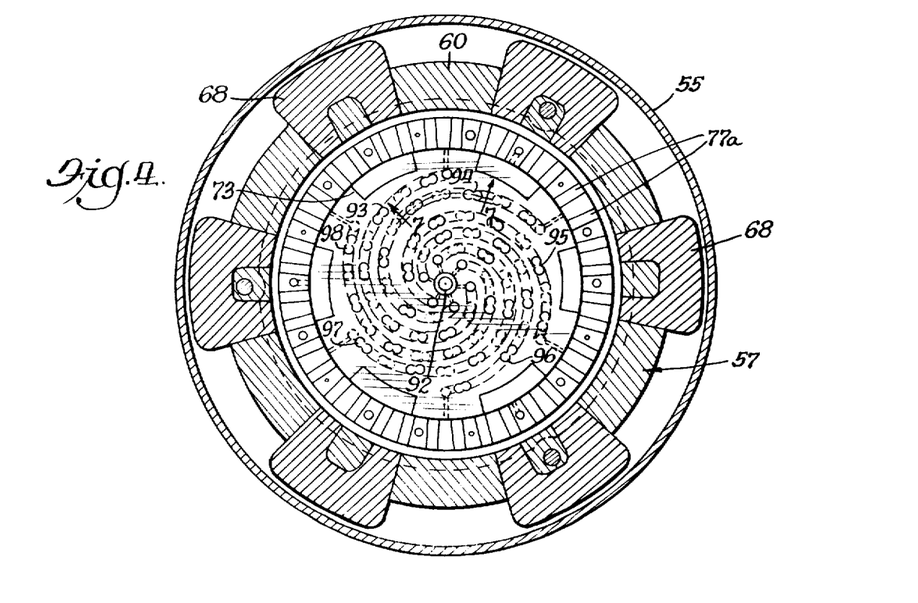
FIG. 4 is a horizontal cross-sectional view of one of the filtering units of the ultrafilter of FIG. 3.

Turning then to FIG. 4, a plurality of permanent magnets 68 (having a U shape in plan view) are embedded in the cylindrical side wall 60 of the rotor 57 in spaced angular relation and facing inwardly. A disc-shaped impeller 70 is rotatably mounted within the section 64 by means of a central bushing 71, and the peripheral rim of the impeller 70 is provided with a plurality of soft iron pieces, associated with each of the magnets 68 (as seen best in FIG. 4) so that as the rotor 57 is driven by its associated motor, the impeller 70 will be driven in angular rotation by magnetic action.

The unit or section 64 is defined by an upper chamber wall having the general shape of a disc, a lower chamber wall 76 of similar shape, and an annular side wall 77. Above the upper chamber wall 75 is a manifold section 78 which will be described in more detail within. The lower chamber wall 76 of the first section 64 of the ultrafiltration system also comprises the upper chamber wall of the second section 65 of the ultrafiltration system. The second section 65 is similarly provided with a lower chamber wall 79 and an annular side wall 80. A rotor 81 is rotatably mounted to the lower surface of the chamber wall 76. Finally, the final section 66 is defined by the chamber wall 79, and annular side wall 82 and a lower disc-shaped chamber wall 83. A rotor 84 is rotatably mounted to the lower surface of the chamber wall 79.

Returning now to the section 64, it includes first and second membranes 86 and 87 which are located respectively above and below the impeller 70 so as to divide the first section 64 into three separate chambers, the top chamber being designated 88 and located between the lower surface of the chamber wall 75 and the upper membrane 86. The intermediate chamber is designated 89, and it is located between the membranes 86 and 87. The lower chamber is designated reference numeral 90 and it is located between the lower membrane 87 and the chamber wall 76.

The sides of the membranes 86, 87 are sealed with the inner surface of the annular side wall 77, and the center of the membrane 86 defines an aperture for the mounting of the impeller 70, to which mounting the membrane 86 is also sealingly secured.

Embedded in the annular side wall 77 are a plurality of soft iron pins 77a which extend radially therethrough and are located at equal angular increments about the periphery of the wall 77, the spacing between adjacent ones of the pins 77a being small enough so that no matter what position the rotor 57 assumes, one of the pins 77a will be in register with each pull face of the permanent magnets 68. The function of the soft iron pins 77a is to reduce the air gap in the magnetic field established between the permanent magnets 68 of the rotor 57 and the magnetic pieces 73 which are embedded in the periphery of the impeller 70.

Turning now to the structure of the impeller 70, fluid is coupled into each of the sections 64–66 by means of a generally vertical conduit (the vertical input conduit for the section 64 being designated by reference numeral 92 in FIG. 4) which is in fluid communication with six radially extending conduits, each leading to a separate spiral channel, these channels being designated respectively 93–98 in FIG. 4. Although each of the channels 93–98 is spiral in plan view, it is so formed as to alternately communicate between the upper and lower surface of the disc impeller 70 in an undulating manner. That is, referring to FIG. 7, which is a view of channel 94 taken as though the spiral shape were opened into a common plane, the channel 94 is in fact formed from a plurality of separate channels each angularly inclined relative to the other so that fluid passing through the channel 94 will be forced alternately against the membranes 86, 87 as it courses through the undulating channel. Thus, the material which passes through the filters 86, 87 will be collected in the chambers 88 and 90, whereas the filtrand will be collected from the chamber 89 adjacent the periphery of the impeller 70.

It will be observed by thus forming a plurality of spirally-radiating channels, each of which directs the fluid alternately between upper and lower filtering membrane as the fluid courses through a channel, maximumm utilization is made of the area of the filtering membranes no dead spots appear in the membranes as the impeller 70 is rotated, and clogging of the membranes is minimized.

The structure and operation of the second and third sections 65 and 66 of the ultrafiltration system are similar to the first section 64, except that each of the second sections has finer filtering membranes, the membranes for section 65 being designated 97 and 98, and the membranes for section 66 being designated 99 and 100. As mentioned, the fluid is normally passed into the filtering sections under pressure, so that it courses through each spiral channel under pressure and assisted by centrifugal force exerted on it by the rotating impeller. In order to minimize undesired deflection of the membranes 86, 87, the upper and lower collection chambers 88 and 90 are filled with porous stainless steel pads (not shown in the drawing for clarity). The separating chamber walls 75, 76, 79 and 83, as well as the annular side walls 77, 80 and 82 are secured together and attached to the manifold 78 by means of a plurality of axially extending wire rods 102. The manifold 78, in turn, is rigidly secured to the casing 55 which is stationary.

The plasma which passes through one of the extractors 18 or 36 of FIG. 1 is processed in the ultrafilter of FIGS. 3 and 4. The ultrafiltration, as indicated, is preferably carried out in two separate stages wherein the first stage (section 64 of FIG. 3) separates materials having a molecular weight greater than about 100,000, and the material which passes through that stage is then processed in parallel by the stages 65 and 66 wherein components having a molecular weight greater than about 10,000 are filtered out. For this purpose, the membranes 86 and 87 may be of the type indicated as Model No. PM-10 of the membranes available under the trademark Diaflo and manufactured by Amicon Corporation of Lexington, Massachusetts. These particular materials exclude the very large proteins having a molecular weight greater than about 100,000. The membranes 97–100 of the second and third sections (comprising the second filtration stage) may be Model Nos. UM-2 of the Diaflo membranes. These particular materials exclude proteins of intermediate range, for example 95 per cent and 90 per cent retentivity respectively of myoglobin and 100 per cent and 95 per cent retentivity respectively of pepsin. The flux (that is, the volume per unit area of membrane per unit of time) for plasma has been found to depend upon pressure and stirring of the filtering cell contents to prevent caking of protein on the membrane. Operating the cells at a pressure of 50–70 psi with a total available effective membrane area of 350 square centimeters for the second and third sections would yield a flow rate of the order of 80 milliliters per minute on a continuous, non-interrupted basis.

Figure 5:
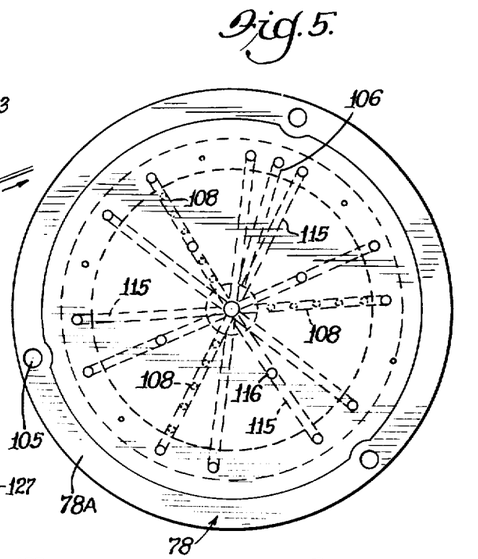
FIGS. 5 and 6 are diagrammatic views of the filtration system illustrating lead in and output conduits.
Figure 6:
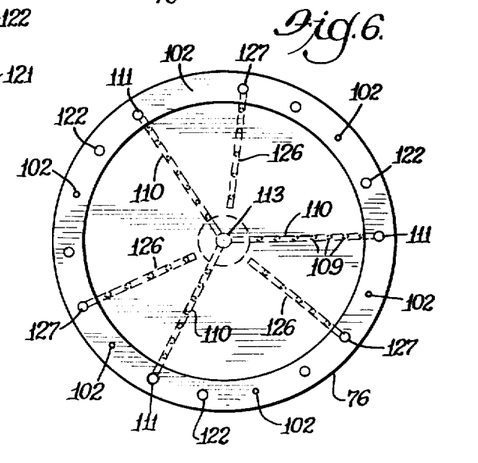
Figure 7:
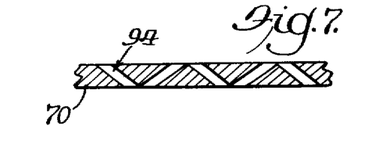
FIG. 7 is a vertical cross-sectional view of one spiral channel of the ultrafilter system of FIG. 3 taken along the path 7—7 of FIG. 4.
Figure 8:
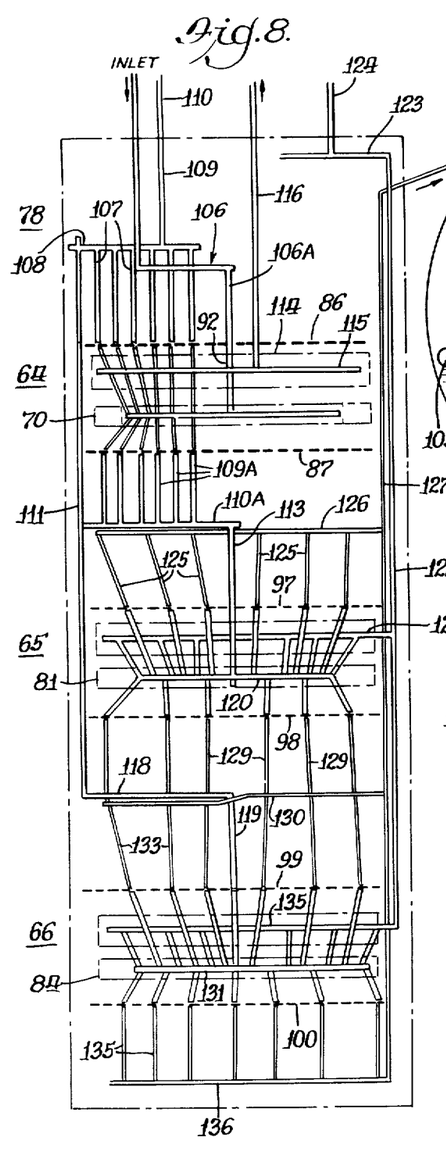
FIG. 8 is a vertical diagrammatic showing of the various interconnections in the ultrafilter system of FIG. 3.

Turning now to FIGS. 5, 6 and 8, a more detailed explanation will be given of the interconnecting conduits of the ultrafiltration system. As already mentioned, the individual side walls and chamber walls that define the filtration chambers are held together by means of high tensile strength steel wires 102, which also secures these filtration units to the manifold 78. The manifold 78 includes an upper peripheral flange 78a (see FIGS. 3 and 5) which is secured to the housing 55 by means of bolts 105. In FIG. 5, there are shown schematically the conduits for the various liquid phases within the filtration system. The plasma from the extractor is coupled into a radially-inwardly extending conduit 106 which, at its innermost location, extends downwardly at 106a and communicates with the inlet conduit 92, (FIG. 4) of the impeller 70. Thus, the plasma all passes through the spiral, undulating channels of the impeller 70. The filtrate of the first section 64 which passes through the membranes 86, 87 is collected by means of a plurality of vertical channels 107 formed in the chamber wall 75 and which communicate with three radially extending channels 108 (also formed in the upper chamber wall 75). A separate vertical conduit 109 is formed in the manifold 78 and upper chamber wall 75 which communicates one of the conduits 108 with an outlet 110 which serves as a tap for filtrate passing through the first stage, if desired. Similarly, the filtrate which passes through the membrane 87 is collected in a plurality of vertically extending conduits 109A formed in the chamber wall 76 and communicating with the lower chamber 90 of the first filtration section. The conduits 109A are in fluid communication with a second set of three radially extending conduits 110A formed in the chamber wall 76. The radial conduits 108 and 110A are interconnected by means of a vertical conduit 111 which also extends as an inlet conduit to the third section 66. The radial conduits 110A serve not only to collect filtrate from the conduits 109A of the first stage and first filtration section, but they serve also as an inlet to the second stage 65 by means of a central vertical conduit 113.

The filtrand with larger molecules which do not pass through the course filters 86 and 87 is collected after it has completely passed through the spiral, undulating channels of the impeller 70 in a collection zone schematically designated by the closed line 114 in FIG. 8 and representing a plurality of radially extending bores formed in the annular side wall 77 of the first chamber, which then communicates with radial conduits 115, one of which is interconnected with a vertical axis conduit 116 for returning the molecules of higher molecular weight of the plasma for reconstitution.

Turning now to the second filtration stages which comprises sections 65 and 66 of the embodiment of FIG. 3, the inlet conduit for the second section, namely conduit 113, has already been described. The inlet conduit to the third section includes a radial conduit 118 formed in the chamber wall 79 and communicating the lower end of the side vertical conduit 111 with a central vertical conduit 119. Preferably, there are three separate vertical conduits 111 to increase the capacity of the system, and they are formed through the chamber walls 76 and 79, as well as through the annular side walls 77 and 80. The radial conduits 118 are formed in the chamber wall member 79.

Turning now to the second section of the filtration system, and particular to FIG. 6, it is seen wherein the radial conduits 110 in the chamber wall 76 collect filtrate from the first stage of filtration and transmit it to the vertical conduit 113 communicating with the center of the impeller 81 of the second section. The impeller 81 has a plurality of spiral, undulating channels similar to those formed in the impeller 70, and they need not be described in any further detail for a complete understanding of the invention. The spiral channels of the impeller 81 schematically illustrated by the horizontal channel 120 in FIG. 8. The components which do not pass through the fine filters 97, 98 in stage two are collected in a conduit 121 which communicates with a vertical conduit 122. The conduit 122 extends upwardly into the manifold 78 where it communicates with a radial conduit 123 which, in turn, communicates with a vertical conduit 124 for returning these components for reconstitution with the other components being returned to the blood system of the animal being processed.

The ultrafiltrate which passes through the fine filter membrane 97 is collected by means of a plurality of conduits 125, the upper ends of which communicate with a series of three radial conduits 126 formed in the upper chamber wall 76. These radial conduits 126 communicate with a plurality of vertical conduits 127 from which the ultrafiltrate is withdrawn.

The ultrafiltrate which passes through the membrane 98 of the second section 65 is collected in a plurality of vertically oriented conduits 129 which communicate with radial conduits 130 similar to the previously-described conduits 126, except that they are located in the chamber wall member 79. The horizontal radial conduits 130 also communicate at their outer edges with the vertical ultrafiltrate outlet conduit 127.

As has already been mentioned, the third section 66 of the filtration system operates in parallel with the second section 65. Hence, the spiral channels of the impeller 84 (which are schematically illustrated by the horizontal line 131) are in communication with the vertical conduit 119 which couples the filtrate from the first stage of filtration as already described. The ultrafiltrate which passes through the fine filter membrane 99 is collected in a plurality of generally vertical conduits 133 which communicate with the radial conduits 130, already described. Similarly, the ultrafiltrate which passes through the fine filter membrane 100 is collected in a plurality of generally vertical conduits 135 which feed three radial conduts schematically designated at 136 which also communicate with the vertical conduits 127 coupling the ultrafiltrate to an output port. The components which do not pass through the filters 99, 100 are collected in conduits schematically shown at 135 which communicate with the vertical conduit 122 and are directed for reconstitution.

In summary, there are five fluid phases in the ultrafiltration system of the illustrated embodiment. The first fluid stage is coupled in at the inlet, and it is the plasma which has been extracted from the blood of the animal being processed (whether host or recipient). The plasma is fed to a first filtration stage employing relatively coarse filters. The material which does not pass through these relatively coarse filters constitutes the second fluid phase in the filtration system, and it is fed via the conduit 116 back for reconstitution with the cells of the animal being processed and the ultrafiltrate of the other animal. The third fluid phase is the filtrate of the first filtration system, and it is fed for processing to the second filtration stage (comprising the second and third sections of the embodiment of FIG. 3). The fourth fluid phase is the material which does not pass through the relatively fine filters of the second filtration stage, and it is collected and passed for reconstitution with the cells and large molecular weight components of the animal being processed as well as the ultrafiltrate of the other animal. The fifth and final fluid phase, then, is the ultrafiltrate which passes through the very fine membranes. It is collected in the vertical conduits 127.

The spinning of the impeller, together with the spiral, undulating channels in each impeller, move the fluid being processed outwardly while alternately flushing it against the top and bottom membranes. This alternate flushing of the fluid against the membranes keeps the fluid whirling around the membranes and this prevents a build-up of material on the filtering elements.

To further prevent build-up of material on the membranes, it may be desirable to operate the system in a wash/rinse cycle. Turning to FIG. 1, this is accomplished by closing the valve 39, opening the valve 39a, disconnecting the output of the plasma extractor 18 to the inlet conduit 22, closing off both outlet conduits 24, 39c of the ultrafiltration system, and passing the exchange ultrafiltrate through the open check valve 39a into the ultrafilter 23. The rotor and impellers are continuously driven with all outlets cut off to promote a loosening and mixing of any protein that may have accumulated on the membranes with the exchange ultrafiltrate. The exchange ultrafiltrate is then withdrawn from the filtration system rinsing with it the loosened and mixed accumulated protein. Several such wash and rinse cycles between regular filtration would facilitate keeping the membranes in good working order. If desirable the wash and rinse could be directed not only to inlet 22, but also to inlet 110 so as to flush out the second pair of filtration chambers as well as the first chamber.

As an alternative filtration system to the one which has been disclosed, devices are commercially available which will yield outputs of over 160 milliliters per minute at operating pressures of 60-90 psi. One such apparatus is manufactured by Amicon Corporation, and known as the TC-1 ultrafiltration system. A lighter and more compact pump such as the one disclosed is, however, preferred.

Having thus described in detail the preferred embodiment of the inventive system, persons skilled in the art will be able to modify certain of the structure and steps which have been disclosed and to substitute equivalent elements for those which have been illustrated while continuing to practice the inventive principle; and it is, therefore, intended that all such modifications and substitutions be covered as they are embraced within the spirit and the scope of the appended claims.

I claim:

1. Ultrafiltration apparatus comprising: housing means providing a plurality of filtering sections each defining a closed chamber; a disc-shaped impeller having an upper and a lower surface and rotatably mounted in each chamber and defining a plurality of spiral channels extending outwardly from the center to the periphery thereof, each channel alternately communicating with the space above and below its associated channel, for communicating a fluid therein alternately with the upper and lower sides thereof at a plurality of locations spaced progressively along said channel; first and second filtering membranes for each chamber and mounted respectively above and below an associated impeller; first conduit means associated with each chamber for coupling a fluid to be processed to the center of its associated impeller and into said channels; second conduit means for each chamber communicating with said chamber at locations above said upper membrane and below said lower membrane for collecting fluid passing through said membranes and for returning said filtrate; third conduit means for each chamber and communicating with the space between said membranes for collecting the filtrand; and powered means for rotating said impellers, whereby as said impellers are rotated, the fluid to be processed passes through said first conduit means of each filter section, enters the center portion of said impellers, passes through said channels under centrifugal force alternately contacting said first and second filter means at a plurality of progressively outwardly spaced locations during said passage, and the filtrate is collected by said second conduit means whereas the filtrand is passed to said third conduit means.

2. The apparatus of claim 1 wherein said filter sections comprise an upper and a lower filter section and wherein the second conduit means of one of said filter sections is in fluid communication with the first conduit means of the other filter section, whereby said fluid is treated serially in each of said filter sections.

3. The apparatus of claim 1 wherein said housing means comprises a fixed housing and a manifold attached to said housing, said manifold providing said filter sections arranged in an upper and a lower filter section, each of said impellers being generally disc-shaped and coaxially located relative to each other within their associated chambers, adjacent chambers being separated by a wall.

4. The apparatus of claim 1 wherein each of said impellers is provided with a plurality of peripherally located permanent magnets and wherein said power means comprises a cup-shaped rotor including a set of magnets associated with each filter section and located adjacent the peripheral magnets of an associated impeller, whereby as said rotor is rotated, each impeller will be driven in rotary motion through magnetic coupling.

5. The apparatus of claim 1 wherein said filter sections are arranged in an upper filter and a lower filter section separated by a wall, and wherein said second conduit means of said upper filter section communicates with the first conduit means of said lower filter section through said wall, and wherein said third conduit means for each filter section communicates with its associated chamber adjacent the periphery of its associated impeller.

* * * * *